United States Patent
Shukla

(10) Patent No.: US 11,468,894 B2
(45) Date of Patent: *Oct. 11, 2022

(54) SYSTEM AND METHOD FOR PERSONALIZING DIALOGUE BASED ON USER'S APPEARANCES

(71) Applicant: DMAI, Inc., Los Angeles, CA (US)

(72) Inventor: Nishant Shukla, Hermosa Beach, CA (US)

(73) Assignee: DMAI, INC., Los Angeles, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/233,716

(22) Filed: Dec. 27, 2018

(65) Prior Publication Data

US 2019/0206407 A1 Jul. 4, 2019

Related U.S. Application Data

(60) Provisional application No. 62/612,125, filed on Dec. 29, 2017.

(51) Int. Cl.
*G10L 15/24* (2013.01)
*G10L 15/22* (2006.01)
(Continued)

(52) U.S. Cl.
CPC ............ *G10L 15/24* (2013.01); *G06V 20/10* (2022.01); *G10L 15/22* (2013.01); *G10L 25/63* (2013.01);
(Continued)

(58) Field of Classification Search
None
See application file for complete search history.

(56) References Cited

U.S. PATENT DOCUMENTS 9,197,864 B1* 11/2015 Starner .............. H04N 5/23222
2011/0093158 A1* 4/2011 Theisen ................. G06F 9/453
701/29.5
(Continued)

FOREIGN PATENT DOCUMENTS

| CN | 104350541 A | 2/2015 |
| KR | 10-1336641 | 12/2013 |
| WO | 2017173141 A1 | 10/2017 |

OTHER PUBLICATIONS

International Search Report and Written Opinion dated Mar. 22, 2019 in International Application PCT/US2018/067654.
(Continued)

*Primary Examiner* — Jonathan C Kim
(74) *Attorney, Agent, or Firm* — Venable LLP

(57) ABSTRACT

The present teaching relates to method, system, medium, and implementations for enabling communication with a user. Information representing surrounding of a user engaged in an on-going dialogue is received via the communication platform, wherein the information includes a current response from the user in the on-going dialogue and is acquired from a current scene in which the user is present and captures characteristics of the user and the current scene. Relevant features are extracted from the information. A state of the user is estimated based on the relevant features and a dialogue context surrounding the current scene is determined based on the relevant features. A feedback directed to the current response of the user is generated based on the state of the user and the dialogue context.

21 Claims, 15 Drawing Sheets

(51) Int. Cl.
*G10L 25/63* (2013.01)
*G06V 20/10* (2022.01)

(52) U.S. Cl.
CPC .. *G10L 2015/225* (2013.01); *G10L 2015/226* (2013.01)

(56) References Cited

U.S. PATENT DOCUMENTS

| | | | | |
|---|---|---|---|---|
| 2013/0307771 | A1* | 11/2013 | Parker | G06F 3/167 345/158 |
| 2014/0289323 | A1* | 9/2014 | Kutaragi | G06F 16/5866 709/206 |
| 2015/0100157 | A1 | 4/2015 | Houssin et al. | |
| 2016/0104486 | A1* | 4/2016 | Penilla | G10L 15/02 704/232 |
| 2016/0109941 | A1* | 4/2016 | Govindarajeswaran | G06F 16/54 345/156 |
| 2016/0236690 | A1* | 8/2016 | Juneja | G10L 13/04 |
| 2016/0302711 | A1* | 10/2016 | Frank | G06F 16/24578 |
| 2016/0379643 | A1* | 12/2016 | Ito | G10L 15/1822 704/270.1 |
| 2017/0160813 | A1* | 6/2017 | Divakaran | G06N 5/022 |
| 2017/0162197 | A1* | 6/2017 | Cohen | G10L 15/22 |
| 2017/0228520 | A1* | 8/2017 | Kidd | G16H 20/13 |
| 2018/0018373 | A1* | 1/2018 | Yazdian | G06F 16/24573 |
| 2018/0068012 | A1* | 3/2018 | O'Connor | G06F 16/5854 |
| 2018/0136615 | A1 | 5/2018 | Kim et al. | |
| 2018/0204572 | A1* | 7/2018 | Manabe | G10L 13/00 |
| 2018/0204573 | A1* | 7/2018 | Iwasa | G10L 15/30 |
| 2019/0033957 | A1* | 1/2019 | Shionozaki | G06F 16/00 |
| 2019/0049942 | A1* | 2/2019 | Dusane | G10L 15/22 |
| 2019/0050494 | A1* | 2/2019 | Rao | G06F 16/313 |
| 2019/0065627 | A1* | 2/2019 | De Mel | G06F 40/295 |
| 2019/0188261 | A1* | 6/2019 | Herzig | G06F 40/30 |
| 2019/0205390 | A1* | 7/2019 | Fang | G06F 40/30 |
| 2019/0206393 | A1* | 7/2019 | Fang | G06N 5/04 |
| 2019/0206401 | A1* | 7/2019 | Liu | G06V 40/174 |
| 2019/0206402 | A1* | 7/2019 | Shukla | B25J 11/0005 |
| 2019/0206407 | A1* | 7/2019 | Shukla | G06V 20/10 |
| 2019/0255995 | A1* | 8/2019 | Friedman | B60W 50/14 |
| 2020/0013401 | A1* | 1/2020 | Saito | G10L 15/22 |
| 2020/0152193 | A1* | 5/2020 | Onaka | G10L 15/22 |

OTHER PUBLICATIONS

International Preliminary Report on Patentability dated May 20, 2021 in International Application PCT/US2019/059841.

* cited by examiner

SYSTEM AND METHOD FOR PERSONALIZING DIALOGUE BASED ON USER'S APPEARANCES

CROSS-REFERENCE TO RELATED APPLICATIONS

This application claims priority to U.S. provisional application No. 62/612,125, filed Dec. 29, 2017, the contents of which are incorporated herein by reference in its entirety.

The present application is related to U.S. patent application Ser. No. 16/233,539, filed Dec. 27, 2018, International Application No. PCT/US2018/067630, filed Dec. 27, 2018, U.S. patent application Ser. No. 16/233,566, filed Dec. 27, 2018, International Application No. PCT/US2018/067634, filed Dec. 27, 2018, U.S. patent application Ser. No. 16/233,640, filed Dec. 27, 2018, International Application No. PCT/US2018/067641, filed Dec. 27, 2018, U.S. patent application Ser. No. 16/233,678, filed Dec. 27, 2018, International Application No. PCT/US2018/067649, filed Dec. 27, 2018, International Application No. PCT/US2018/067654, filed Dec. 27, 2018, U.S. patent application Ser. No. 16/233,786, filed Dec. 27, 2018, International Application No. PCT/US2018/067666, filed Dec. 27, 2018, U.S. patent application Ser. No. 16/233,829, filed Dec. 27, 2018, International Application No. PCT/US2018/067672, filed Dec. 27, 2018, U.S. patent application Ser. No. 16/233,879, filed Dec. 27, 2018, International Application No. PCT/US2018/067680, filed Dec. 27, 2018, U.S. patent application Ser. No. 16/233,939, filed Dec. 27, 2018, International Application No. PCT/US2018/067684, filed Dec. 27, 2018, U.S. patent application Ser. No. 16/233,986, filed Dec. 27, 2018, International Application No. PCT/US2018/067690, filed Dec. 27, 2018, U.S. patent application Ser. No. 16/234,041, filed Dec. 27, 2018, and International Application No. PCT/US2018/067695, filed Dec. 27, 2018, which are hereby incorporated by reference in their entireties.

BACKGROUND

1. Technical Field

The present teaching generally relates to human machine communication. More specifically, the present teaching relates to adaptive human machine communication.

2. Technical Background

With advancement of artificial intelligence technologies and the explosion in Internet based communications because of the ubiquitous Internet's connectivity, computer aided dialogue systems have become increasingly popular. For example, more and more call centers deploy automated dialogue robot to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continue fixed conversation patterns, which will likely cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, a traditional machine dialogue system is completely unaware and continues the conversation in the same manner that has annoyed the human. This not only makes the conversation end unpleasantly (the machine is still unaware of that) but also turns the person away from conversing with any machine based dialogue system in the future.

In some applications, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for human machine communication. More specifically, the present teaching relates to adaptive human machine communication.

In one example, there is provided a method, implemented on a machine having at least one processor, storage, and a communication platform capable of connecting to a network for enabling communication with a user. Information representing surrounding of a user engaged in an on-going dialogue is received via the communication platform, wherein the information includes a current response from the user in the on-going dialogue and is acquired from a current scene in which the user is present and captures characteristics of the user and the current scene. Relevant features are extracted from the information. A state of the user is estimated based on the relevant features and a dialogue context surrounding the current scene is determined based on the relevant features. A feedback directed to the current response of the user is generated based on the state of the user and the dialogue context.

In a different example, a system for enabling communication with a user. The system includes a multimodal data analysis unit that is configured for receiving information representing surrounding of a user engaged in an on-going dialogue, wherein the information includes a current response from the user in the on-going dialogue, is acquired from a current scene in which the user is present and captures characteristics of the user and the current scene, and extracting relevant features from the information. The system includes a user state estimator configured for estimating a state of the user based on the relevant features, and a dialogue context info determiner configured for determining a dialogue context surrounding the current scene based on the relevant features. The system includes a dialogue controller configured for generating a feedback directed to the current response of the user based on the state of the user and the dialogue context.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided a machine readable and non-transitory medium coded with information for enabling communication with a user, wherein the information, once read by the machine, causes the machine to perform a series of steps. Information representing surrounding of a user engaged in an on-going dialogue is received via the communication platform, wherein the information includes a current response from the user in the on-going dialogue and is acquired from a current scene in which the user is present and captures characteristics of the user and the current scene. Relevant features are extracted from the information. A state of the user is estimated based on the relevant features and a dialogue context surrounding the current scene is determined based on the relevant features. A feedback directed to the current response of the user is generated based on the state of the user and the dialogue context.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details or with different details related to design choices or implementation variations. In other instances, well known methods, procedures, components, and/or hardware/software/firmware have been described at a relatively high-level, without detail, in order to avoid unnecessarily obscuring aspects of the present teachings.

The present disclosure generally relates to systems, methods, medium, and other implementations directed to illustrated embodiments of the present teaching, the related concepts are presented in a human machine dialogue in which the present teaching may be deployed. Specifically, the present teaching is related to the concept of initiating a human machine dialogue adaptively in accordance with the observed surroundings, including the state of the person to be engaged in the dialogue, the settings of the environment, etc. In addition, during the dialogue, the person and the setting of the dialogue are continuously observed, analyzed, and used to adaptively conduct the dialogue accordingly in order to enhance user experience and improve user engagement. Although certain exemplary figures and disclosures are presented to describe the concepts associated with the present teaching, it is understood that the present teaching can be applied to any setting different from what is presented herein without limitation.

Figure 1:
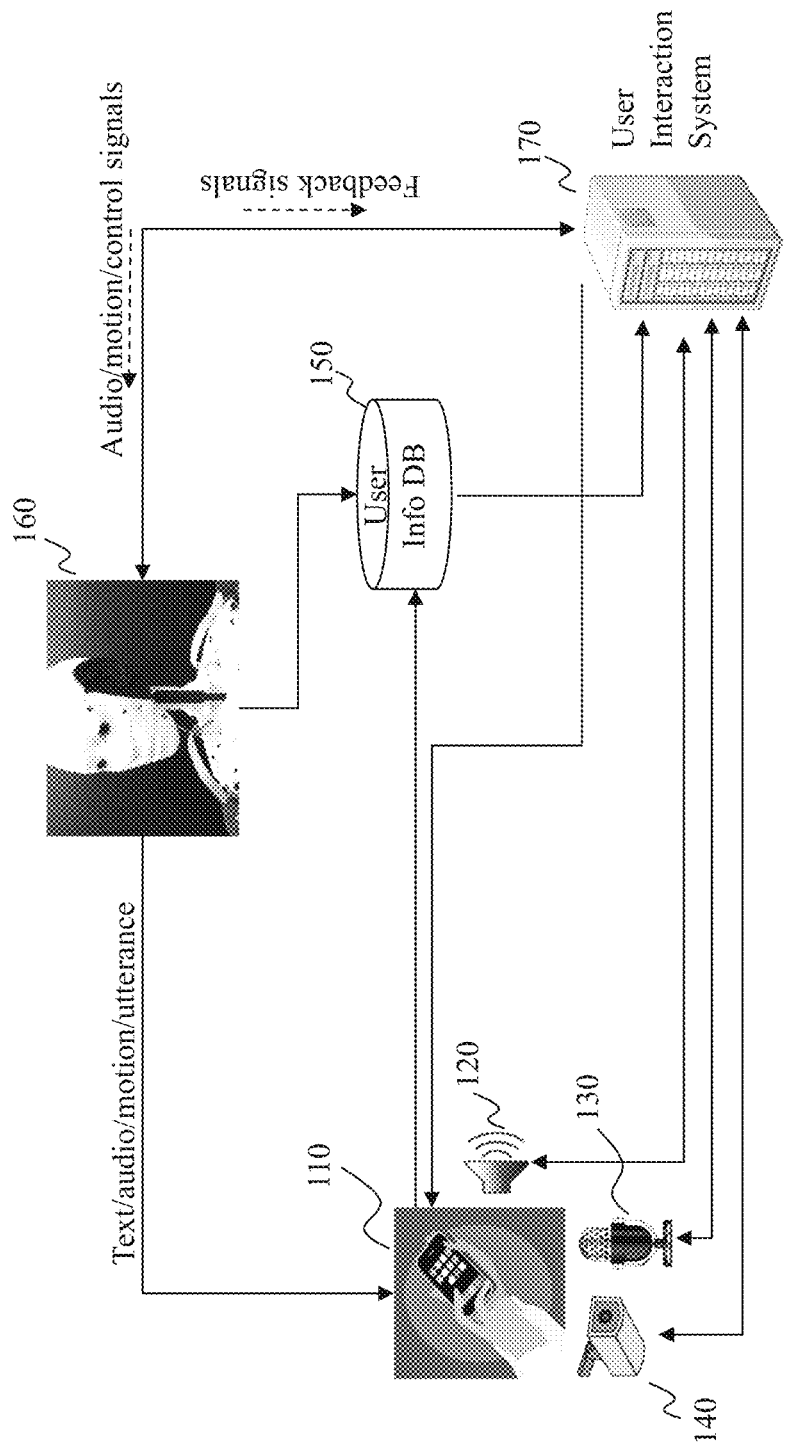
FIG. 1 depicts connections among a user device, an agent device, and a user interaction system during a dialogue, in accordance with an embodiment of the present teaching.

FIG. 1 depicts a general framework for human machine dialogue with information flow among different parties, according to an embodiment of the present teaching. As shown, the framework comprises a user device 110, an agent device 160, and a user interaction system 170 that are connected via network connections during a dialogue. The user device may be deployed with various sensors in one or more modalities, e.g., sensor(s) 140 acquiring visual data (images or video), sensor(s) 130 acquiring acoustic data including the utterances of the user or sound from the dialogue environment, sensors acquiring text information (what the user wrote on a display), or haptic sensor (not shown) capturing touch, movement, etc. of the user. Such sensor data may be captured during the dialogue and used to facilitate an understanding of the user (expression, emotion, intent) and the surrounding of the user. Such sensor data provide contextual information and can be explored to customize a response accordingly.

In a variant embodiment, a human conversant may communicate directly with the user interaction system 170 without the agent device 160. When the agent device is present, it may correspond to a robot which may be controlled by the user interaction system 170. In some embodiments, the user device 110 may communicate directly with the user interaction system 170 without the agent device. In such an embodiment, the functionalities to be performed by the agent device (e.g., to utter a word or a sentence, to convey text information, or to express certain emotions such as frowning, smile, or sad) may be performed by the user interaction system 170. Thus, although the disclosure below may discuss certain concepts with respect to either the agent device or the user interaction system, the concepts as disclosed may be applied to either or a combination of the two. Moreover, in the embodiments described herein, reference to a machine side may mean either the agent device or the user interaction system, or a combination thereof.

As depicted, connections between any two of the parties in FIG. 1 may be bi-directional. The agent device 160 may interface with a user via a user device 110 to carry out a dialogue in a bi-directional manner. In operation, the agent device 160 may be controlled by the user interaction engine 170 to, e.g., utter a response to the user operating the user device 110. According to the present teaching, inputs from the user's side, including, e.g., the user's utterance or action, the appearance of the user, as well as information about the surrounding of the user, are provided to the agent device 160 or to the user interaction system 170 via network connections.

In some embodiments, the agent device 160 or the user interaction system 170 may be configured to process such input and use relevant information identified from such input to dynamically and adaptively generate a response to the user. Such a response includes, e.g. an utterance to convey a verbal response or a change to be made in the agent device to render a different scene to be displayed to the user. For example, the agent device or the user interaction system 170 may observe, from the input from the user device, that the user is wearing a yellow shirt and appears to be bored. An adaptive response from the agent device or the user interaction system may be generated that comment on how nice the user looks. Such a response may re-direct the user's attention to the dialogue. As another example, assume that the response from the machine (either the agent device or the user interaction system) is to render an object e.g., a tree on the user device. Based on the sensor input from the user device, it may be determined that the surrounding of the user indicates that it is winter season. Knowing that, the machine may adaptively instruct the user device to render the tree without leaves (to be consistent with the surrounding of the user).

As another example, if a machine response is to render a duck on the user device, information about the user may be retrieved, e.g., from the user information database 130, on user's color preference and provide rendering instructions to the user device by customizing the duck in a user's preferred color (e.g., yellow or brown). Such customization, based on either on-the-fly observations of the user or the surrounding thereof or user's known preferences, is performed adaptively with respect to the user and the current dialogue environment.

In this manner, the machine side (either the agent device or the user interaction system or a combination thereof) may base its decision on how to respond to a user on what is observed during the dialogue. Based on the input from the user device, the machine side may determine the state of the dialogue and expression/emotion/mindset of the user and generate a response that is based on the specific situation of the dialogue and the intended purpose of the dialogue (e.g., for teaching a child the English vocabulary) given the observed situation. In some embodiments, if information received from the user device indicates that the user appears to be bored and impatient, machine side may change the state of a dialogue related to one topic (e.g., geometry in a math education related dialogue) to a different topic that may be of interest to the user, e.g., basketball. Such a switch of topic may be determined based on an observation that the user is gazing at a basketball in the room. The switch of topic thereby continues to engage the user in the conversation.

In some embodiments, the user device may be configured to process raw sensor data acquired in different modalities and send the processed information (e.g., relevant features of the raw inputs) to the agent device or the user interaction engine for further processing. This will reduce the amount of data transmitted over the network and enhance the communication efficiency.

As shown, during a dialogue between the user and the machine, the user device 110 may continually collect multi-modal sensor data related to the user and his/her surroundings, which may be analyzed to detect any information relevant to the dialogue and used to intelligently control the dialogue in an adaptive manner. This may enhance the user experience and/or engagement. The sensor data provide contextual information surrounding the dialogue and enables the machine to understand the situation in order to manage the dialogue more effectively.

Figure 2:
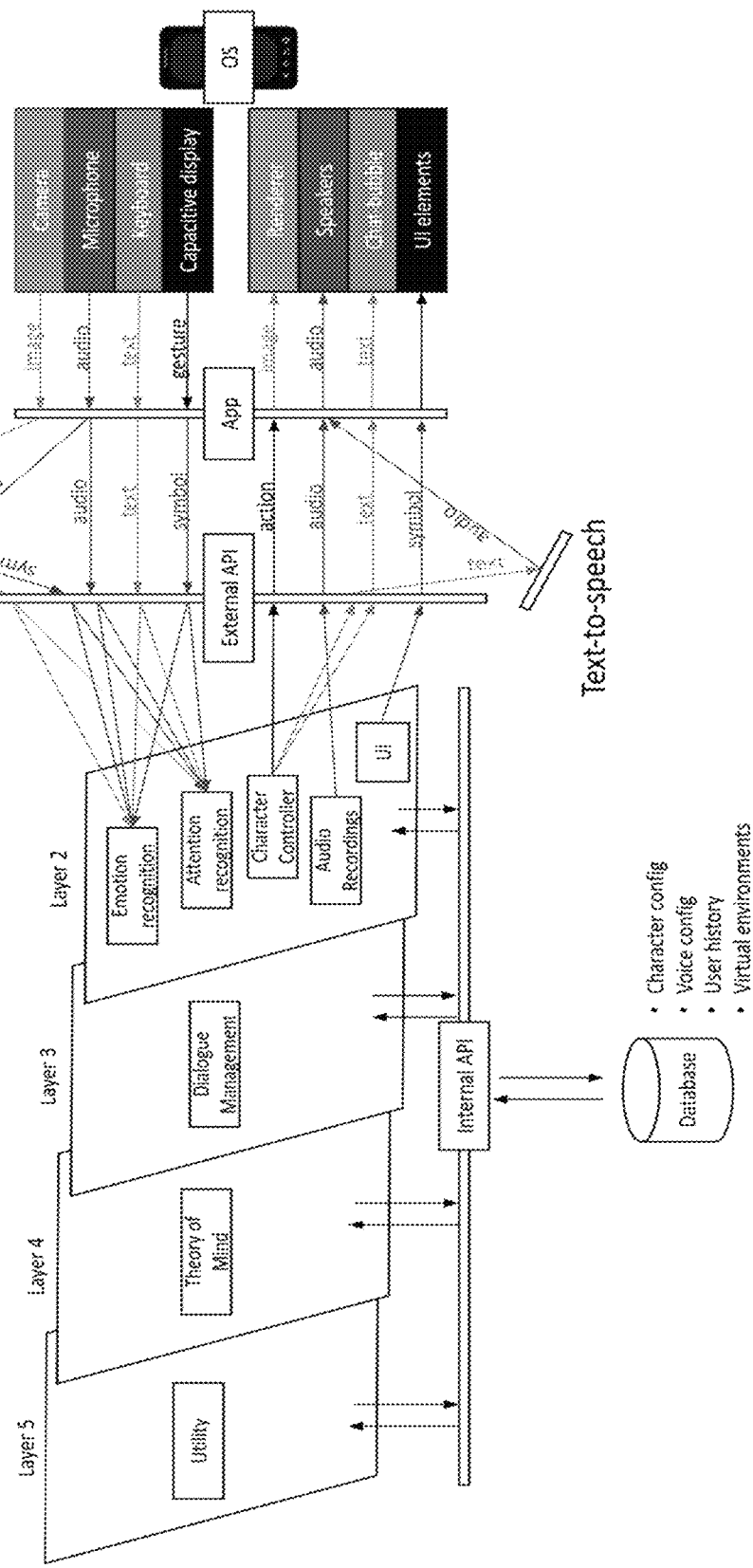
FIG. 2 depicts an exemplary high level system diagram for an automated dialogue companion with multiple layer processing capabilities, according to an embodiment of the present teaching.

FIG. 2 depicts an exemplary high level system diagram for an automated dialogue companion with multiple layer processing capabilities, according to an embodiment of the present teaching. In this illustrated embodiment, the overall system may encompass components/function modules residing in the user device 110, the agent device 160, and the user interaction engine 170. The overall system as depicted herein comprises a plurality of layers of processing and hierarchies that together carry out human-machine interactions in an intelligent manner. In the illustrated embodiment, there are 5 layers, including layer 1 for front end application as well as front end multi-modal data processing, layer 2 for characterizations of the dialog setting, layer 3 is where the dialog management module resides, layer 4 for estimated mindset of different parties (human, agent, device, etc.), layer 5 for so called utility. Different layers may correspond to different levels of processing, ranging from raw data acquisition and processing at layer 1 to processing changing utilities of participants of dialogues at layer 5.

The term "utility" is hereby defined as preferences of a party identified based on detected states, which are associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system as depicted in FIG. 2, front end applications as well as front end multi-modal data processing in layer 1 may reside in the user device 110 and/or the agent device 160. For example, the camera, microphone, keyboard, display, renderer, speakers, chat-bubble, and user interface elements may be components or functional modules of the user device. For instance, there may be an application or client running on the user device which may include the functionalities before an external application interface (API) as shown in FIG. 2. In some embodiments, the functionalities beyond the external API may be considered as the backend system or reside in the user interaction engine 170. The application running on the user device may take multi-model data (audio, images, video, text) from the sensors or circuitry of the user device, process the multimodal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimate or infer various features that may be used to infer higher level characteristics such as expression, characters, gesture, emotion, action, attention, intent, etc. Such higher level characteristics may be obtained by processing units at layer 2 and then used by components of higher layers, via the internal API as shown in FIG. 2, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represent a human user's preferences. Such preferences may be captured dynamically during the dialogue at the utility layer (i.e., layer 5). As shown in FIG. 2, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 2, information sharing between layer 1 and rest of the layers is via an external API while sharing information among layers 2-5 is via an internal API. It is understood that this merely a design choice and other implementations are also possible to realize the present teaching presented herein. In some embodiments, through the internal API, various layers (2-5) may access information created by or stored at other layers to support the processing. Such information may include common configuration to be applied to a dialogue (e.g., character of the agent device is an avatar, preferred voice, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (e.g., a duck) may be accessed from, e.g., an open source database, that provide parameters (e.g., parameters to visually render the duck and/or parameters needed to render the speech from the duck).

Figure 3:
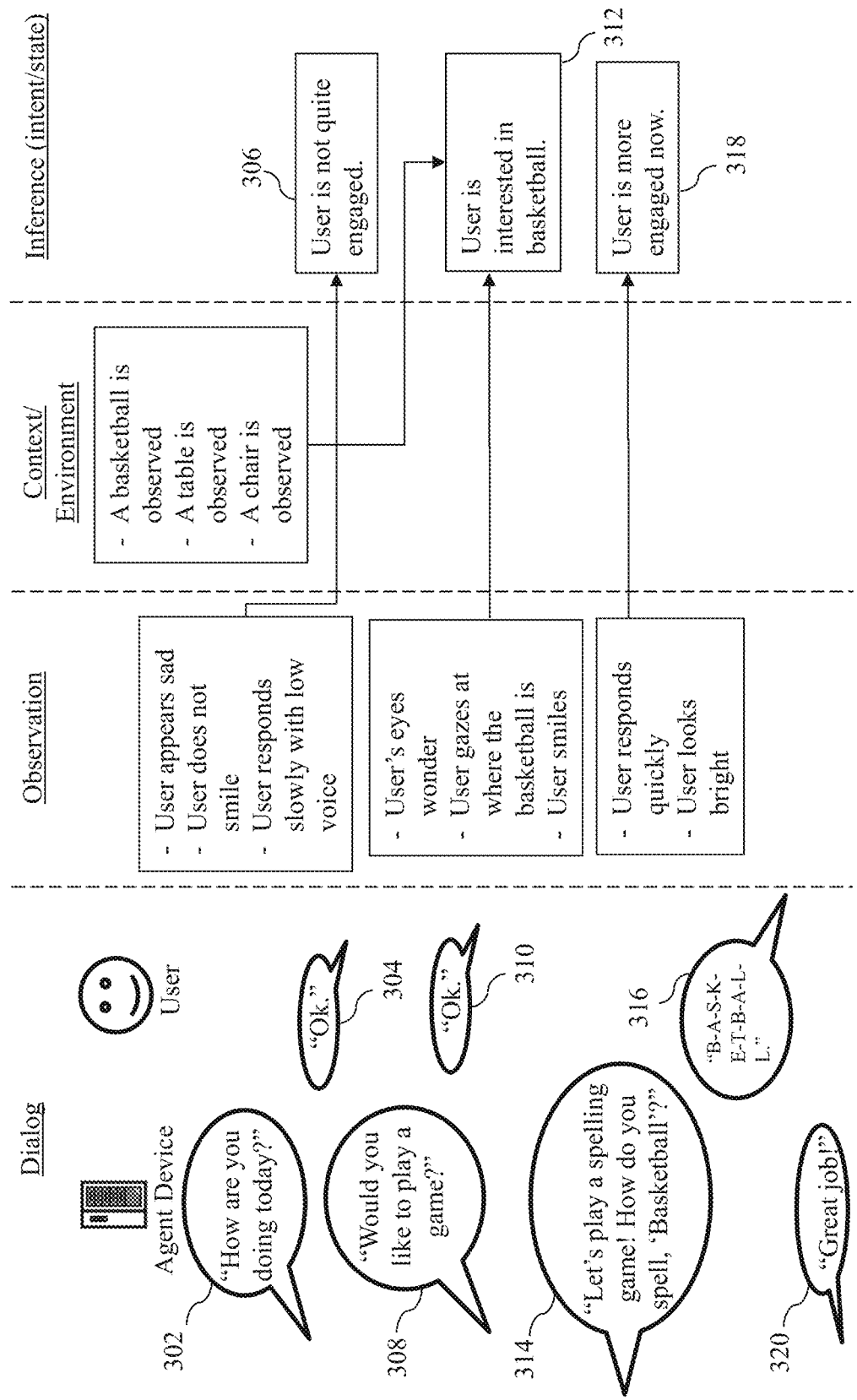
FIG. 3 illustrates a dialogue process in which contextual information is observed and used to infer the situation in order to devise adaptive dialogue strategy, according to an embodiment of the present teaching.

FIG. 3 illustrates a dialogue process in which contextual information is observed and used to infer the situation in order to devise adaptive dialogue strategy, according to an embodiment of the present teaching. As seen from FIG. 3, operations at different layers may be conducted and together they facilitate intelligent dialogue in a cooperated manner. In the illustrated example, while observing that the user is in a normal mode, the 160 agent device may first ask a user "How are you doing today?" at 302 to initiate a conversation. In some embodiments as disclosed herein, if the user appears to be in a bad mode, the machine (either the agent device 160 or the user interaction system 170) may initiate using a different sentence, e.g., "Are you okay?" (not shown). In response to utterance at 302, the user may respond with utterance "Ok" at 304. To manage the dialogue, the automated dialogue machine may activate different sensors for capturing the dynamic situation during the dialogue to enable observation of the user and the surrounding environment. For example, the automated dialogue machine may activate multi-modal sensors to acquire multimodal data. Such multi-modal data may include audio, visual, or text data. For example, visual data may capture the facial expression of the user. The visual data may also reveal contextual information surrounding the scene of the conversation. A picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated dialogue machine (e.g., by the front end user device or by the backend user interaction engine 140) to assess the attitude, emotion, mindset, and utility of the users. For example, based on visual data analysis, the automated dialogue machine may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 306) that the user is not that interested in the current topic and not that engaged. Such inference of emotion or mental state of the user may, for instance, be performed at layer 4 based on characterization of the multi-modal data associated with the user.

To respond to the user's current state (appearing not engaged), the automated dialogue machine may determine to perk up the user in order to better engage the user. In this illustrated example, the automated dialogue machine may leverage what is available in the conversation environment by uttering a question to the user at 308: "Would you like to play a game?" Such a question may be delivered in an audio form as speech by converting text to speech, e.g., using customized voices individualized for the user. In this case, the user may respond by uttering, at 310, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 312, that the user is interested in basketball.

Based on the acquired new information and the inference based on that, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generate a response, suggesting the user to play a spelling game" (at 314) and asking the user to spell the word "basketball."

Given the adaptive dialogue strategy of the automated companion in light of the observations of the user and the environment, the user may respond providing the spelling of word "basketball." (at 316). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 318, that the user is now more engaged. To further encourage the user to actively participate in the dialogue, the automated companion may then generate a positive response "Great job!" with instruction to deliver this response in a bright, encouraging, and positive voice to the user.

Figure 4:
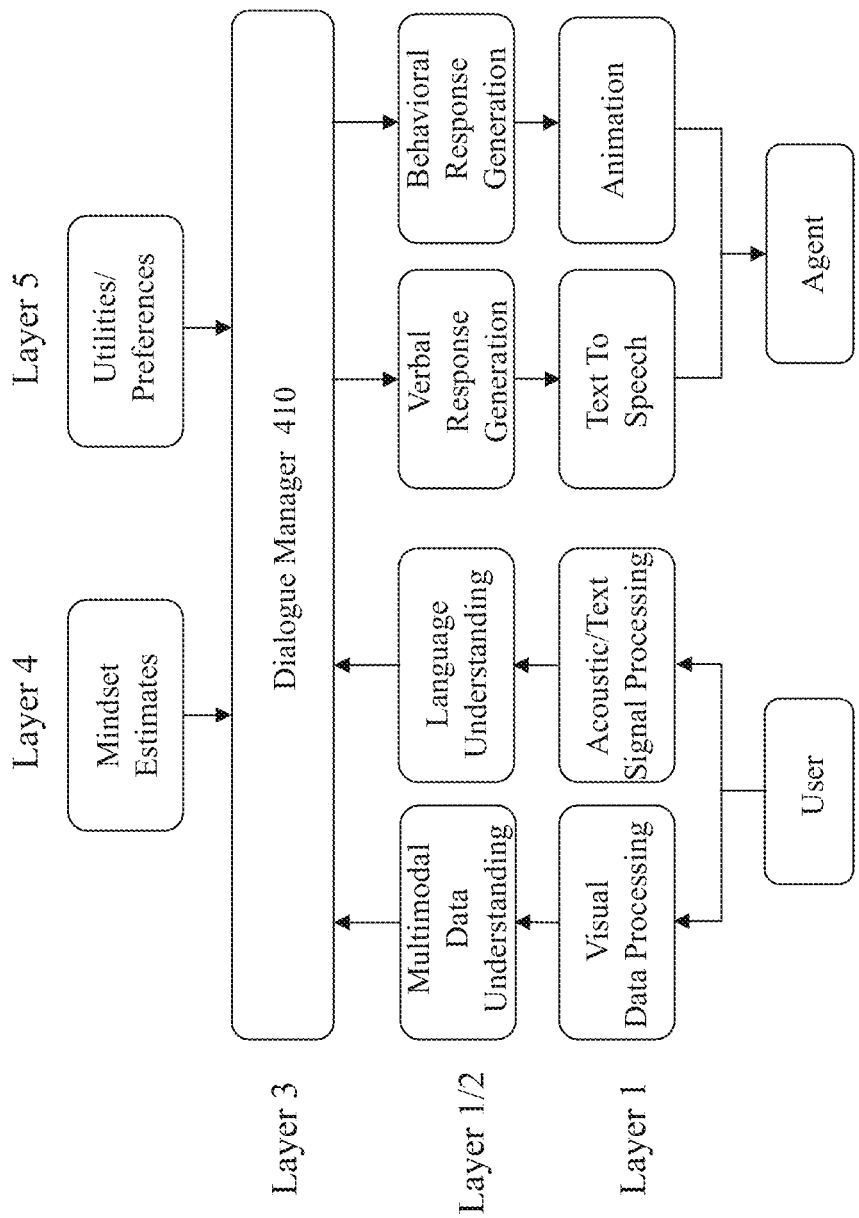
FIG. 4 illustrates exemplary multiple layer processing and communications among different processing layers of an automated dialogue companion, according to an embodiment of the present teaching.

FIG. 4 illustrates exemplary multiple layer processing and communications among different processing layers of an automated dialogue system, according to an embodiment of the present teaching. The dialogue manager 410 in FIG. 4 corresponds to a functional component of the dialogue management at layer 3. A dialog manager is an important part of the automated companion and it manages dialogues. Traditionally, a dialogue manager takes in as input a user's utterances and determines how to respond to the user. This is performed without taking into account the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agent.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continuing the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 410 is a core component of the automated companion. As shown in FIG. 4, DM 410 (layer 3) takes input from different layers, including input from layer 2 as well as input from higher levels of abstraction such as estimated mindset from layer 4 and utilities/preferences from layer 5. As illustrated, at layer 1, multi-modal information is acquired from sensors in different modalities which is processed to, e.g., obtain features that characterize the data. This may include signal processing in visual, acoustic, and textual modalities.

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The modal-data understanding generated at layer 2 may be used by DM 410 to determine how to respond. To enhance engagement and user experience, the DM 410 may also determine a response based on the estimated mindset of the user from layer 4 as well as the utilities of the user engaged in the dialogue from layer 5. An output of DM 410 corresponds to an accordingly determined response to the user. To deliver a response to the user, the DM 410 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 410 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 4. Such a response in its determined deliverable form(s) may then be used by a renderer to actually render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 5:
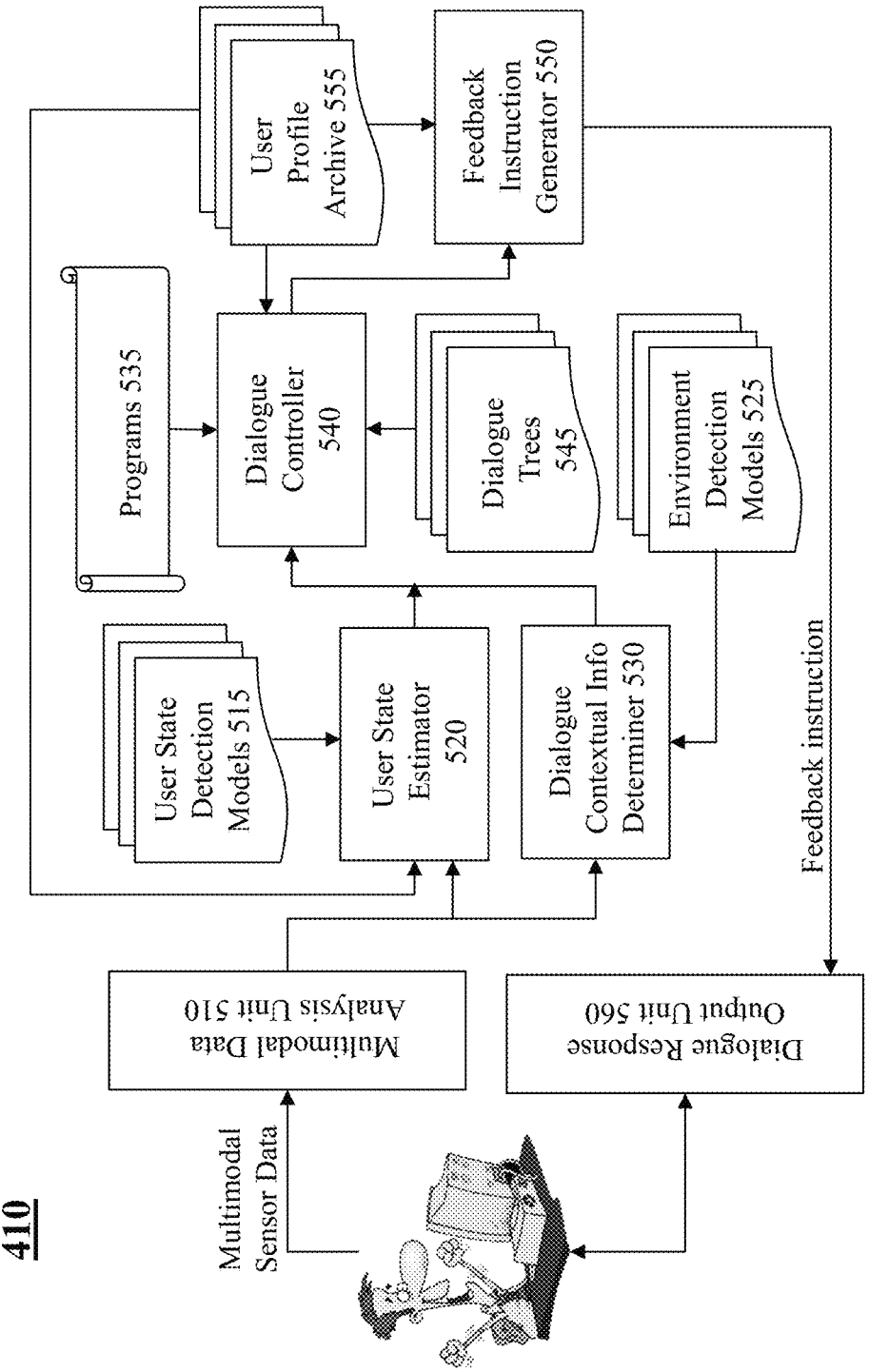
FIG. 5 depicts an exemplary high level system diagram of a human machine dialogue framework, according to an embodiment of the present teaching.

FIG. 5 depicts an exemplary high level system diagram for the dialogue manager 410 for personalized dialogue management, according to an embodiment of the present teaching. In this illustrated embodiment, the dialogue manager 410 comprises a multimodal data analysis unit 510, a user state estimator 520, a dialogue contextual info determiner 530, a dialogue controller 540, a feedback instruction generator 550, and a dialogue response output unit 560. The dialogue manager 410 as depicted herein controls both how to intelligently initiate a conversation with a user based on what is observed as well as how to respond to a user during a conversation based on what is observed.

Figure 7A:
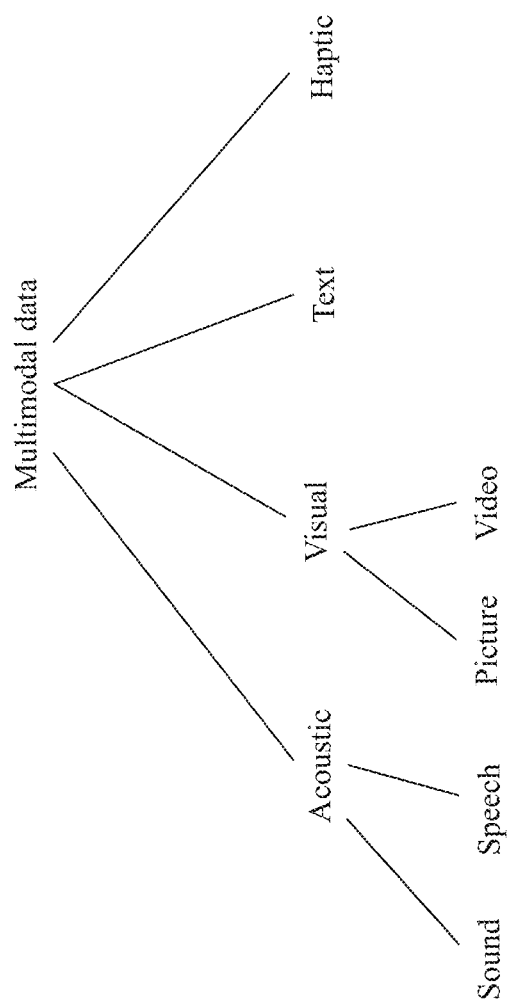
FIG. 7A illustrates exemplary types of multimodal data that can be acquired during a dialogue, according to an embodiment of the present teaching.

The multimodal data to be analyzed by the multimodal data analysis unit 510 may include acoustic signals, which may correspond to environmental sound or speech, visual signals which may include video and picture images, text information or information from a haptic sensor that characterizes, e.g., movement of finger, hands, head, or other different parts of the user's body. This is illustrated in FIG. 7A.

Figure 7B:
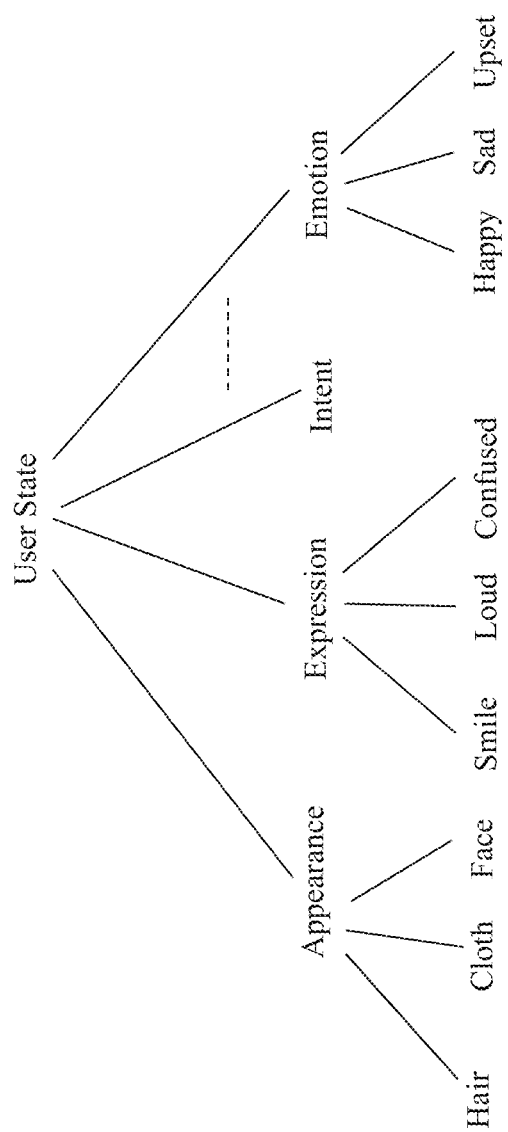
FIG. 7B illustrates exemplary types of user state information, according to an embodiment of the present teaching.

The user state estimator 520 and the dialogue contextual info determiner 530 estimate, based on the processed multimodal data from the multimodal data analysis unit 510, the user's state and contextual information surrounding the dialogue scene, respectively. FIG. 7B illustrates exemplary types of user state information, according to an embodiment of the present teaching. A user's state may include the physical appearance of the user, including the skin color, hair color/style, facial tone, eye color, cloth (color, style), . . . , etc. A user's state may also relate to the expression of the user, such as smile, frowning, winking, confusion, loudness of the voice, . . . , etc. The user's state may also be related to what the user said and in what manner. Based on the audio signal, speech recognition may be performed based on the audio signal to determine the text of the user's utterance. The pitch and tone of the speech may also be recognized which may be used, together with visual cues from the visual data, to estimate the user's expression or emotion. The expressions of a user may be used to infer his/her emotion such as happy, sad, upset, bored, . . . , etc. In some situations, expressions/emotions may also be used to infer intent. For example, if a user's expression indicates that he/she is bored but his/her eyes gazed at a ball nearby, it may be inferred that the user is interested in talking about a topic related to the ball (e.g., basketball game) which is related to intent.

To facilitate the user state estimator 520, appropriate models may be provided in 515. The estimation of the user's state may be performed based on different models. In the illustrated embodiments, the user state detection models may include model(s) for detecting features of different aspects related to the user, including but is not limited to, appearance (color of the cloth the user is wearing, skin color/tone, gender, hair color, eye color, etc.), facial expressions (smile, frowning, crying, sad, . . . , etc.), emotions (sad, happy, excited, angry, . . . , etc.), modes (upset, indifferent, interested, distracted, . . . , etc.). Based on such models, different information or features may be extracted and utilized to make a determination as to the state of the user.

Figure 7C:
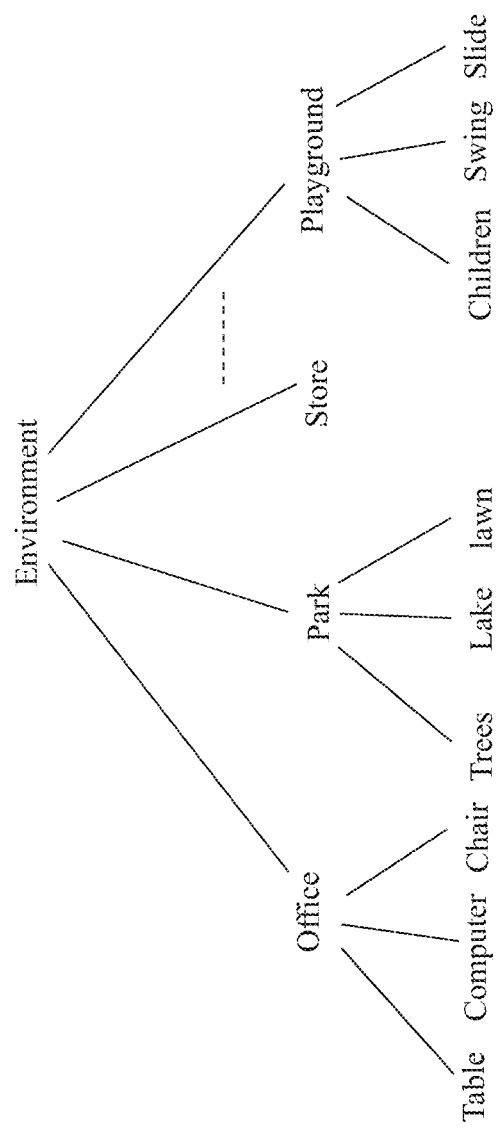
FIG. 7C illustrates exemplary types of conversation environment that may be observed and used as contextual information, according to an embodiment of the present teaching.

To estimate the contextual information surrounding the dialogue scene, the dialogue contextual info determiner 530 detects, based on environment detection models 525, various objects present in the scene captured by the multimodal data and extracts relevant features thereof. To facilitate the determination of the contextual information of the dialogue environment that the user is in, the environment detection models 525 may be appropriately provided for detecting different types of scenes, different types of objects, different characterizations of environments, etc. FIG. 7C illustrates exemplary types of contextual information and/or environment detection models, according to an embodiment of the present teaching. As seen, a dialogue environment may imply a hierarchy of concepts at different conceptual levels, ranging from lower level concepts such as objects present in the dialogue environment (computer, desk, table, ball, chair, cabinet, tree, lawn, sky, lake, children, swing, slide, mountain, . . . , etc.), places (office, park, beach, wildness, store, playground, . . . , etc.), to nature of a place (e.g., vacation place, work place, transit place, . . . , etc.). Using such models, the dialogue contextual info determiner 530 may detect not only what is present in the scene around the user but also a characterization of the place and the nature of the place with respect to the user.

Referring back to FIG. 5, the estimated user state (from the user state estimator 520) and the determined contextual information of the underlying dialogue (from the dialogue contextual info determiner 530) may then be utilized by the dialogue controller 540 to either adaptively initiate a conversation with a user or determine how to respond to the last response from the user. The determination of a feedback (either what is to be said to the user to initiate a conversion or a response to respond to the last utterance from the user) is made based also on the program 535 currently applied to the conversation (e.g., an education session on math), the dialogue tree 545 (which provides a general flow of the conversation), and user information such as preferences from user profile archive 555. Such generated feedback is then processed at the feedback instruction generator 550 to generate instructions for the feedback (e.g., rendering instruction to be sent to the user device to render the machine's response), which is then sent to the user device via the dialogue response output unit 560.

Figure 6:
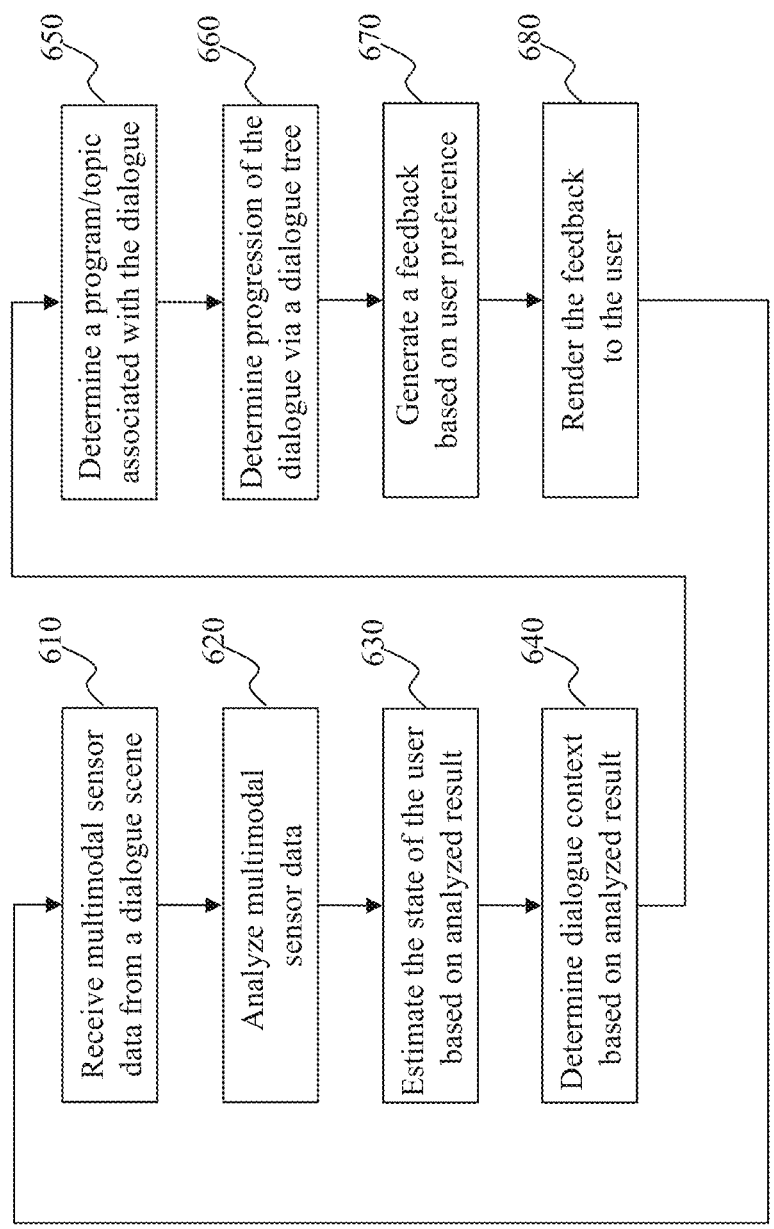
FIG. 6 is a flowchart of an exemplary process of a human machine dialogue framework, according to an embodiment of the present teaching.

FIG. 6 is a flowchart of an exemplary process of the dialogue manager 410, according to an embodiment of the present teaching. When the multimodal data analysis unit 510 receives, at 610, multimodal sensor data from a user device, it analyzes the multimodal sensor data at 620. Based on the analyzed multimodal sensor data, the user state estimator 520 estimates, at 630, the state of the user based on user state detection models 515. As discussed herein, the state of the user includes characterizations of the user at different conceptual levels, some at appearance level, some emotional, etc.

Based on the analyzed multimodal sensor information, the dialogue contextual info determiner 530 determines, at 640, contextual information of the dialogue. In order to determine a feedback to the user (either the initial utterance to be said to the user or a response responding to the last utterance of the user), the dialogue controller 540 determines, at 650, a program/topic associated with the current dialogue. From the program so determined, the dialogue controller 540 may access an appropriate dialogue tree corresponding to the program and identify the node in the dialogue tree corresponding to the current conversation. Based on the dialogue tree, the user state, and the contextual information, the dialogue controller 540 determines, at 660, the progression of the dialogue. There are two possible dialogue scenarios. One is that the dialogue session is at the very beginning, e.g., the user just appeared and the dialogue controller 540 needs to initiate a dialogue according to what is observed. The other scenario is that the dialogue is on-going so that the dialogue controller 540 is to determine how to respond to the user.

For a new conversation wherein, the dialogue controller 540 is to initiate the conversation, if the user newly appears, the dialogue controller 540 is to initiate the conversion. In this situation, the identified dialogue tree is at its initiate node and the dialogue controller 540 is to determine whether what is dictated by the first node of the dialogue tree is appropriate given the estimated user state. For example, if the first utterance of the machine according to the dialogue tree is "Are you ready for today's program?" but the estimated user state may indicate that the user is currently really upset, the dialogue controller 540 may determine not to adopt what is dictated in the dialogue tree and instead generate a different initiating sentence based on, e.g., user's preference from the user profile archive 555 and/or something detected in the dialogue scene such as user's appearance or some objects in the environment of the user. For instance, the user may be known to love to play basketball (from the user profile archive 555) and there is a ball observed in the scene (contextual information from the dialogue contextual info determiner 530), the dialogue controller 540 may determine to initiate the conversion by saying "How would you like to play the ball for a while?" to engage the user.

If the dialogue is an on-going session, the dialogue controller 540 may determine a response based on, e.g., whether the user state is appropriate in order to follow the dialogue tree of the current dialogue. If the estimated user state suggests that it is not appropriate to follow the dialogue tree, e.g., the last utterance from the user does not correspond to any of the predicted answers in the dialogue tree and the user appears to be lost, the dialogue controller 540 may determine not to follow the dialogue tree and instead identify some alternative response. Such an alternative response may be determined adaptively according to the user state and the contextual information. For instance, the user state may indicate that the user is wearing a swimming suit and the contextual information indicates that the user is near a swimming pool. To engage the user in an English language art education dialogue session, the dialogue controller 540 may determine to engage the user in the program by responding "Would you let me know how to spell words 'swim' and 'pool'?" By adapting the dialogue in accordance with the user state (the lost emotion, the appearance of wearing a swimming suit) and the context of the dialogue (there is a pool in the environment) to identify the alternative response to the user may re-orient the user's attention and improve engagement and user experience.

Based on the feedback that the dialogue controller 540 determined (either how to initiate the dialogue or how to respond to the user in an on-going dialogue), the feedback instruction generator 550 generates, at 670, instructions for the user device that can be used to render the feedback to the user and send the instruction to the dialogue response output unit 560, which then sends, at 680, the instruction to the user device.

Figure 8:
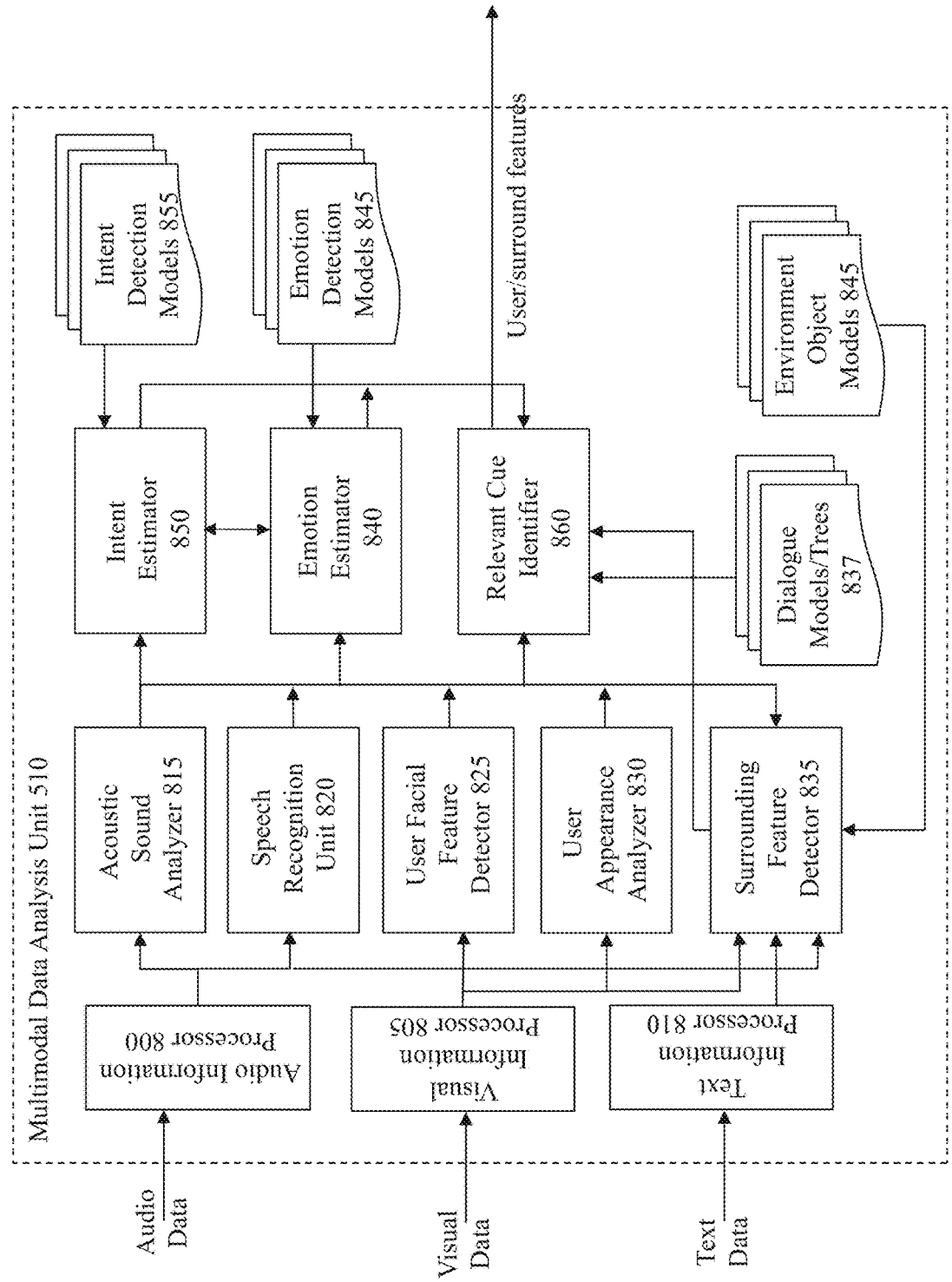
FIG. 8 depicts an exemplary high level system diagram of a multimodal data analyzer, according to an embodiment of the present teaching.

FIG. 8 depicts an exemplary high level system diagram of the multimodal data analysis unit 510, according to an embodiment of the present teaching. As discussed herein, the multimodal data analysis unit 510 is for analyzing the multimodal sensor data, extracting relevant information, and identifying useful cues that can be used in adapting the dialogue. Such cues include both features related to the user and features related to the environment. Based on such multimodal features (visual, acoustic, text, or haptic), the multimodal data analysis unit 510 may also infer, e.g., based on models, higher level concepts such as expressions, emotions, intent, etc. In the illustrated embodiment, the multimodal data analysis unit 510 comprises raw data processing portion, feature extraction portion, and inference portion.

The raw data processing portion comprises an audio information processor 800, a visual information processor 805, and a text information processor 810. Additional raw sensor data processing units may also be included such as a processor for processing, e.g., haptic information (not shown). The processors for processing raw data may be for low level signal processing for, e.g., removing noises, enhancing picture qualities, sub-sampling for reducing the redundant data, etc.

The feature extraction portion may take the output from the raw processing units as input, extract features (face, eyes, skin, sky, tree, words from speech or text, measures related to the speech such as speed, clarity, loudness, pitch, . . . , etc.) relevant to certain characteristics of interests (e.g., expression such as smile, appearances such as eye color, skin tone/color, surrounding objects such as desk, tree color, pool, . . . , etc.). This portion may include an acoustic sound analyzer 815 (for analyzing environmental sounds), a speech recognition unit 820 (for recognizing the utterance of the user and/or of others), a user facial feature detector 825 (for detecting face(s), facial features, and facial expressions), a user appearance analyzer 830 (such as clothing, skin color, etc.), and a surrounding feature detector 835 (for detecting, e.g., different types of objects that appear in the dialogue environment, etc.). These components detect features in respective modalities and such detected features are sent to the inference portion to infer higher level concepts such as emotion, intent, etc.

The inference portion in this illustrated embodiment includes an emotion estimator 840, which may infer emotion of the user based on visual and acoustic features from components 815, 820, 825, and 830, and an intent estimator 850, which may infer intent based on not only the visual and acoustic features from these four components but also the estimated emotion from the emotion estimator 840. For instance, the user facial feature detector 825 may have detected that the user is gazing in a certain direction where there is a ball and the emotion estimator 840 may infer that the user is confused on the substance of the dialogue. Based on such visual cues, the intent estimator 850 may infer that the user's attention is not on the dialogue and desires (intent) to play the ball. Such inferred emotion and intent can be used by the dialogue controller 540 to determine how to continue the dialogue and re-orient the user's attention, as discussed herein. In some embodiments, higher level inference such as estimating emotions or intent may be implemented in the user state estimator 520.

The multimodal data analysis unit 510 may also include a relevant cue identifier 860, which takes input from all components in both feature extraction portion and inference portion (i.e., 815, 820, 825, 830, 835, 840, and 850) and identifies cues that are relevant to the dialogue based on, e.g. dialogue models/trees 837. For instance, if a dialogue is about a travel plan, certain features related to the user (e.g., eye color) or present in the dialogue scene (e.g., a toy duck on a desk) may not be relevant to the dialogue management. In this case, the relevant cue identifier 860 may filter such features out without sending them to the user state estimator 520 or the dialogue contextual info determiner 530 (see FIG. 5).

Figure 9:
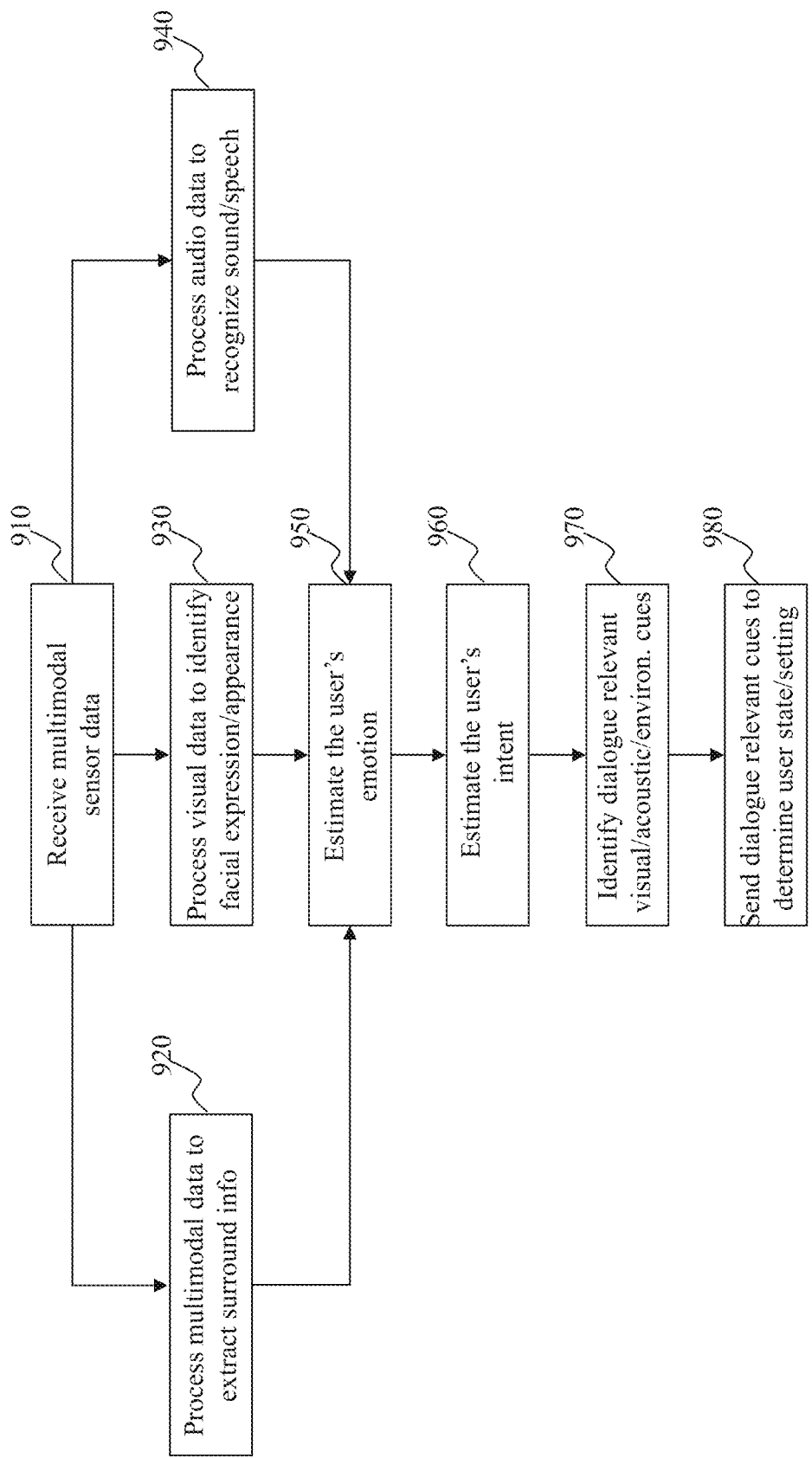
FIG. 9 is a flowchart of an exemplary process of a multimodal data analyzer, according to an embodiment of the present teaching.

FIG. 9 is a flowchart of an exemplary process of the multimodal data analysis unit 510, according to an embodiment of the present teaching. Upon receiving the multimodal data at 910, components in the multimodal data analysis unit 510 process different information to respectively extract and identify relevant information. For example, as seen in FIG. 8, to identify useful cues in the audio domain, the audio information processor 800, the acoustic sound analyzer 815, and the speech recognition unit 820 process, at 940, the audio signal to recognize environmental sounds and/or speech of the user. To identify useful cues in the visual domain, the visual information processor 805, the user facial feature detector 825, and the user appearance analyzer 830 process, at 930, the visual data to identify visual features of the user (such as eyes, nose, skin color, etc.), facial expressions, and user appearance such as hair, cloth, etc. To identify useful cues in the surrounding environment of the user, the surrounding feature detector 835 processes, at 920, data from multiple domains to extract relevant features.

Based on the detected audio and visual features, the emotion estimator 840 estimates, at 950, the emotion of the user. The intent estimator 850 estimates, at 960, the intent of the user based on audio/visual features and/or the estimated emotion of the user. The relevant cue identifier 860 then filter the features and estimates to identify, at 970, relevant visual/audio/environmental cues and sends, at 980, such relevant cues to different components in the dialogue manager 410 (see FIG. 5).

Figure 10:
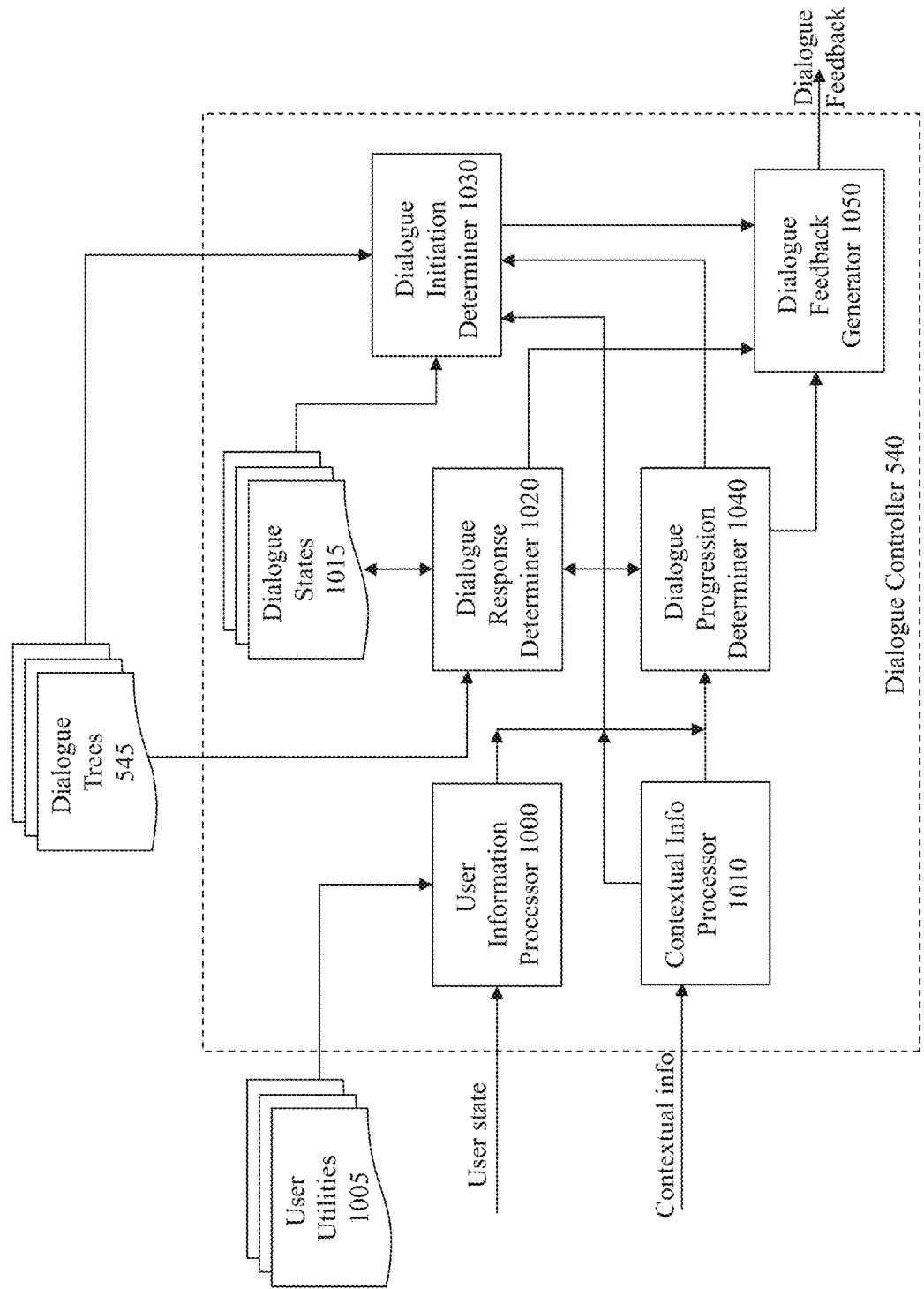
FIG. 10 depicts an exemplary high level system diagram of a dialogue controller, according to an embodiment of the present teaching.

FIG. 10 depicts an exemplary high level system diagram of the dialogue controller 540, according to an embodiment of the present teaching. In this illustrated embodiment, the dialogue controller 540 comprises a user information processor 1000, a contextual info processor 1010, a dialogue progression determiner 1040, a dialogue initiation determiner 1030, a dialogue response determiner 1020, and a dialogue feedback generator 1050. As discussed herein, the dialogue controller 540 determines whether it is to initiate a dialogue or generate a response to the user in an on-going dialogue session. In each situation, the dialogue controller 540 is to produce a feedback, where the feedback is thus either an initial greeting directed to the user in the event of starting a new dialogue or a response generated to respond to the user in an on-going dialogue. In either situation, the feedback is generated intelligently and adaptively based on the user state and the contextual information from the scene.

Figure 11:
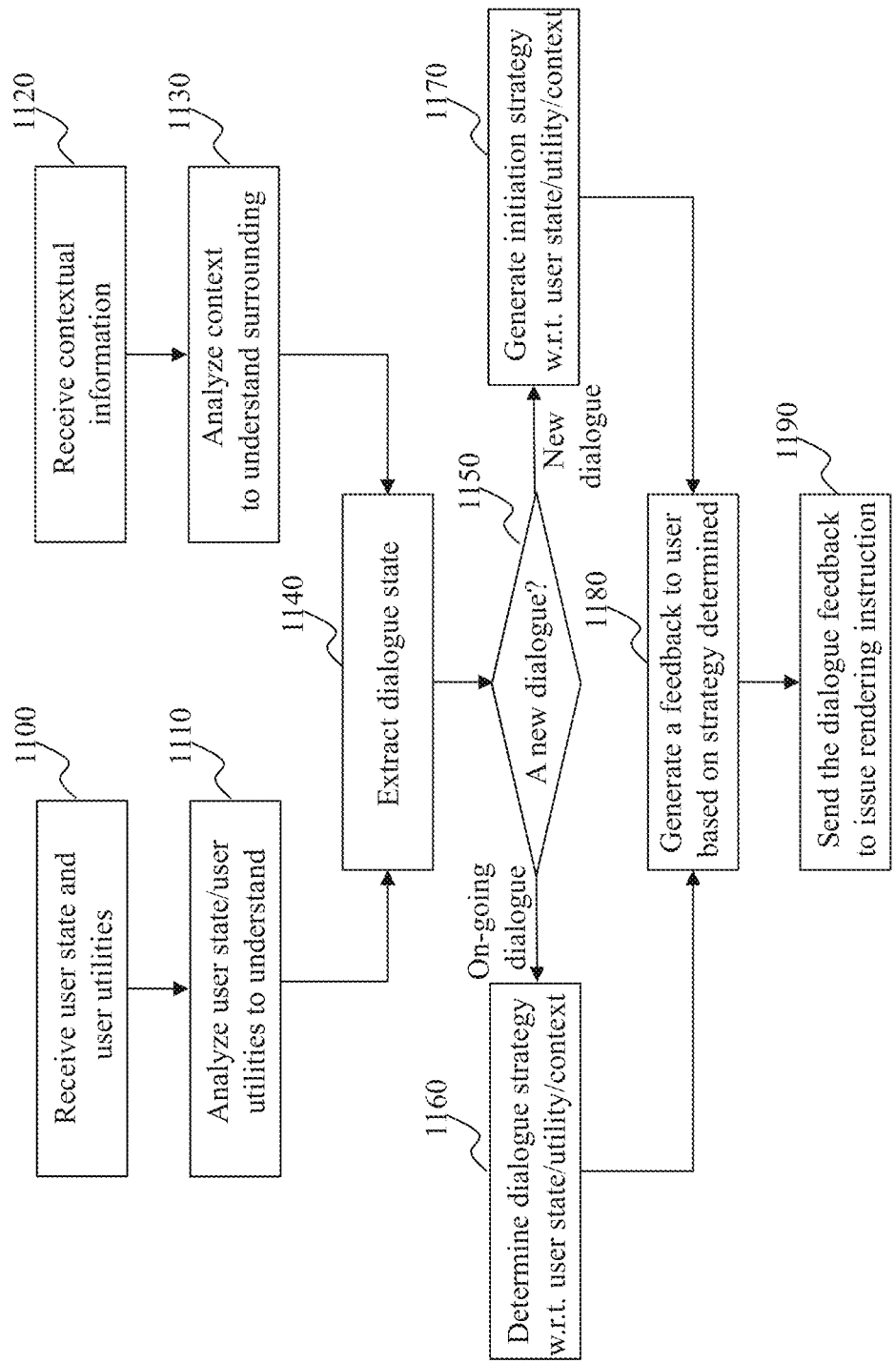
FIG. 11 is a flowchart of an exemplary process of a dialogue controller, according to an embodiment of the present teaching.

FIG. 11 is a flowchart of an exemplary process of a dialogue controller, according to an embodiment of the present teaching. In operation, the user information processor 1000 receives, at 1100, user state information (from the user state estimator 520 in FIG. 5) and the user utilities/preferences from layer 5 (see FIGS. 2 and 4). Based on the received information, the user information processor 1000 analyzes, at 1110, such information to identify different types of relevant information, which may include, e.g., the current mental state of the user (bored), utilities/preferences of the user (likes to intermingle fun things with learning in order to be effective), the appearance of the user (wearing a yellow swimming suit and a red swimming cap), the scheduled program to cover is in English, and/or that the current topic of the user's scheduled program is spelling of simple words in English (if it is an on-going dialogue), . . . , etc. Such relevant information from different sources about the user may be further explored to determine the dialogue initiation/response strategy.

In addition, the contextual info processor 1010 receives, at 1120, contextual information from the dialogue contextual info determiner 530 (see FIG. 5) and analyzes, at 1130, the received contextual information to identify relevant contextual information. For instance, the contextual info processor 1010 may base on the received contextual information that identifies certain objects in the scene (e.g., desk, chair, computer, . . . , bookcase) and conclude that the user is in an office. In other situations, if the contextual information received reports other types of objects such as trees, blue sky, benches, swing, . . . , etc., the contextual info processor 1010 may estimate that the user is in a park. Such conclusions based on the contextual information may also be explored in determining the dialogue initiation/response strategy.

To proceed to determine how to advance the dialogue, depending on whether it is a new dialogue or an on-going dialogue, relevant information such as a state of the dialogue is extracted, at 1140, by the dialogue progression determiner 1040 from, e.g., the user state information and is used to determine, at 1150, the mode of operation accordingly. If it is a new dialogue, the dialogue progression determiner 1040 invokes the dialogue initiation determiner 1030 to determine an initiation strategy. Otherwise, the dialogue mode determiner 1040 invokes the dialogue response determiner 1020 to generate a response strategy.

Upon being invoked, the dialogue initiation determiner 1030 analyzes the processing results from both the user information processor 1000 and the contextual info processor 1010 to understand the user and the surroundings of the user. For instance, the user may be a young boy with brown eyes, dark skin, and curly hair, wearing a yellow shirt (from user state information), and is known to be a slow warmer (i.e., a shy person) when it comes to meeting and conversing with strangers (from user utilities). The processing results from the contextual info processor 1010 may indicate that the user is currently in an office, which has a desk, a chair, a computer on the table, and a box labeled as a lego set also on the table.

Based on what is known about the current user (a slow warmer), the dialogue initiation determiner 1030 may decide, e.g., based on machine learned models, that it may be more appropriate to start the conversion first by talking about something a young boy may like to get the user comfortable before engaging the user into conversation intended (e.g., a program that the user has signed up for learning math). To initiate appropriately with respect to the current user given the contextual information about the surroundings of the user, the dialogue initiation determiner 1030 may generate, at 1160, an individualized dialogue initiation strategy that leverages what is observed in the scene and determine how to initially approach the user. For example, the dialogue initiation determiner 1030 may leverage the lego set observed on the desk and decide to start the conversation by asking "Do you like lego?" Alternatively, the dialogue initiation determiner 1030 may leverage the observed appearance of the user and decide to start the conversation by saying "You look very cheerful today!" Starting a conversation this way is based on a personalized strategy with respect to the user, enabling better user experience and enhancing engagement. In this way, a dialogue initiation strategy for each user may differ but is intelligently adaptive to each user.

In terms of determining a response to the user in an on-going dialogue, the dialogue response determiner 1020 may, in a normal situation as what a traditional dialogue system will do, determine a response based on, e.g., what is dictated in a relevant dialogue tree. However, a dialogue may not always go as planned and in some situations, the machine agent in the dialogue needs to be more adaptive and creative in order to continue to engage a user without unknowingly annoying the user. When such a situation is detected (e.g., by understanding the situation based on multimodal sensor data and analysis thereof), the dialogue response determiner 1020 may perform similar functions as the dialogue initiation determiner 1030 by leveraging relevant information related to the user state and the context of the surrounding environment the user is in.

Compared with a determination on how to initiate a conversation, determining a response for an on-going dialogue, additional operational parameters need to be considered. For example, because it is an on-going dialogue, there is a dialogue history which may impact the response to be decided. In addition, the current user state (e.g., user's emotion) associated with a current state of the corresponding dialogue tree may also impact the decision on an appropriate response, either along the same dialogue tree or outside of the dialogue tree. For example, if a user is in the middle of a conversation with the machine agent on geometry and the user got several answers incorrectly (indicated in the dialogue history). The machine agent may also have observed that the user appears to be frustrated. With this situation (which is observable from the dialogue history and the multimodal data acquired from the user), the dialogue response determiner 1020 may determine, based on certain machine learned models (which may dictate that when the user is frustrated due to incorrect answers, it is appropriate to digress in order not to lose the user), that the user needs to be distracted a bit from the current topic.

On what the machine agent should say to implement the strategy to switch the user's attention to something else, the dialogue response determiner 1020 may leverage what is observed in the scene of the user or the context of the scene. In some situations, the dialogue response determiner 1020 may leverage the detected appearance of the user and devise some distracting response. For instance, if it is observed that the user is wearing a shirt with text "Red Sox" printed thereon, the dialogue response determiner 1020 may decode to ask the user "Are you a fan of Red Sox?" In some situations, the dialogue response determiner 1020 may leverage what is observed in the scene (context) to devise a needed and relevant response. For example, if the contextual information indicates that the user is presently in an office and the office scene includes a lego on a desk, the dialogue response determiner 1020 may decide to ask the user "Do you like Lego?" with the intent that it will later use the lego in the scene to continue the discussion on geometry (e.g., "what is the shape of this lego piece?"). Based on such intelligent and dynamic processing, the dialogue response determiner 1020 may determine, at 1150, an appropriate response in considering the actual dialogue situation observed. Such a response generated for an on-going dialogue session is accordingly adapted to not only each individual user but also to each situation observed at the moment.

The feedback, either an initial thing to say to the user generated by the dialogue initiation determiner 1030 or a response to a user in an on-going dialogue generated by the dialogue response determiner 1020, is then sent to the dialogue feedback generator 1050, which generates, at 1180, a feedback to be provided to the user and sends, at 1190, such generated feedback to the feedback instruction generator 550 (see FIG. 5), where appropriate rendering instruction is to be generated and provided to the user device to render the feedback to the user.

Figure 12:
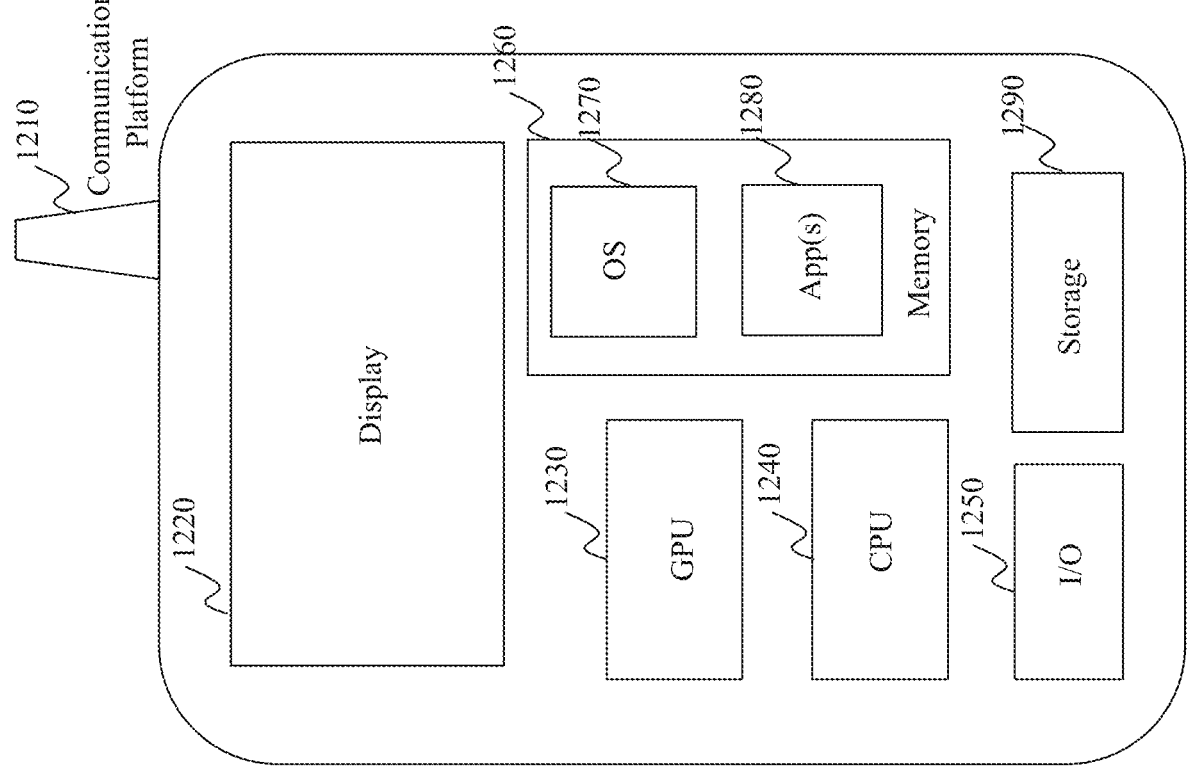
FIG. 12 depicts the architecture of a mobile device which can be used to implement a specialized system incorporating the present teaching.

FIG. 12 depicts the architecture of a mobile device which can be used to realize a specialized system, either partially or fully, implementing the present teaching. In this example, the user device on which content is presented and interacted-with is a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1200 in this example includes one or more central processing units (CPUs) 1240, one or more graphic processing units (GPUs) 1230, a display 1220, a memory 1260, a communication platform 1210, such as a wireless communication module, storage 1290, and one or more input/output (I/O) devices 1250. Any other suitable component, including but not limited to a system bus or a controller (not shown), may also be included in the mobile device 1200. As shown in FIG. 12, a mobile operating system 1270, e.g., iOS, Android, Windows Phone, etc., and one or more applications 1280 may be loaded into the memory 1260 from the storage 1290 in order to be executed by the CPU 1240. The applications 1280 may include a browser or any other suitable mobile apps for receiving and rendering content streams on the mobile device 1200. Communications with the mobile device 1200 may be achieved via the I/O devices 1250.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to query to ads matching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 13:
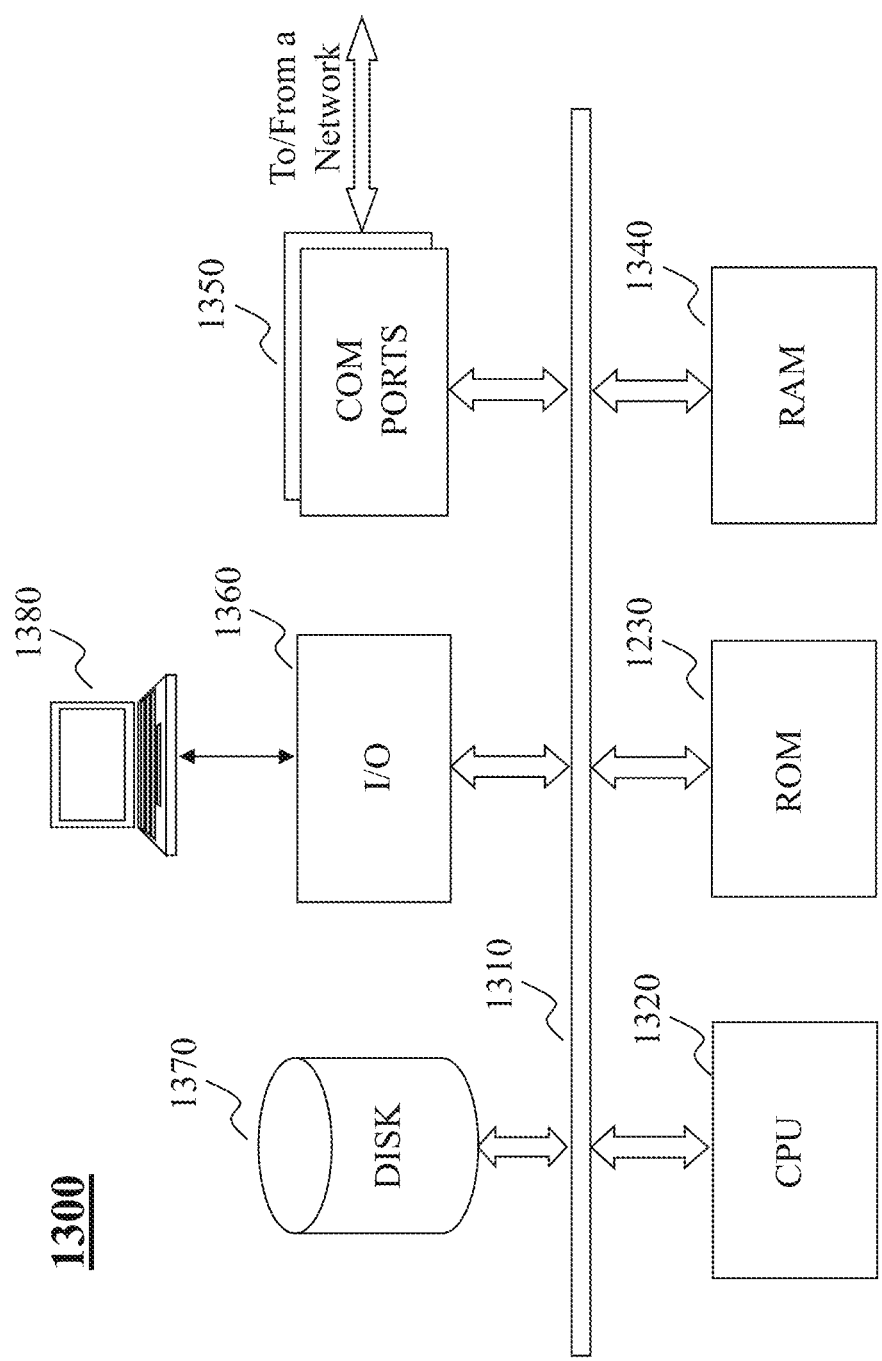
FIG. 13 depicts the architecture of a computer which can be used to implement a specialized system incorporating the present teaching.

FIG. 13 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1300 may be used to implement any component of the present teaching, as described herein. For example, the dialogue manager, the dialogue controller, etc., may be implemented on a computer such as computer 1300, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 1300, for example, includes COM ports 1350 connected to and from a network connected thereto to facilitate data communications. The computer 1300 also includes a central processing unit (CPU) 1320, in the form of one or more processors, for executing program instructions. The exemplary computer platform includes an internal communication bus 1310, program storage and data storage of different forms, e.g., disk 1370, read only memory (ROM) 1330, or random access memory (RAM) 1340, for various data files to be processed and/or communicated by the computer, as well as possibly program instructions to be executed by the CPU. The computer 1300 also includes an I/O component 1360, supporting input/output flows between the computer and other components therein such as user interface elements 1380. The computer 1300 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform for managing a dialogue with a user, comprising:

receiving, via the communication platform, information representing surrounding of a user engaged in an on-going dialogue on a topic of a program with an intended goal, wherein the information includes a current response from the user in the on-going dialogue, is acquired from a current scene in which the user is present, and captures characteristics of the user and the current scene;

extracting relevant features from the information;

detecting, based on the relevant features, a state of the user at different conceptual levels including a physical appearance of the user and one or more expressions of the user;

determining a dialogue context surrounding the current scene, with a physical object therein, based on the relevant features;

accessing a dialogue tree corresponding to the program;

generating a feedback directed to the current response of the user, based on at least one of the dialogue tree, the physical appearance of the user, and the dialogue context, wherein the feedback is on a different topic determined based on one of the physical appearance of the user and the physical object; and continuing on the dialogue with the user on the topic of the program to achieve the intended goal on the topic of the program by leveraging the physical object.

2. The method of claim 1, wherein the information includes multimodal sensor data in at least one of audio, visual, textual, and haptic modalities, where the audio sensor data record the current response from the user and/or acoustic sound from the current scene.

3. The method of claim 1, wherein the state of the user further includes at least one of:

a text representing the current response from the user in the on-going dialogue;

one or more emotions of the user inferred based on the one or more expressions of the user; and an intent of the user inferred based on at least one of the expression and the one or more emotions, wherein the physical appearance includes a color and a style of the user's skin, hair, facial, eye, and cloth, observed from the current scene.

4. The method of claim 1, wherein the dialogue context includes at least one of:

at least one object present in the current scene and a characterization thereof;

an estimated classification of the current scene;

a characterization of the current scene; and a sound heard from the environment of the current scene.

5. The method of claim 1, further comprising determining a topic of the feedback, wherein the topic is one of a subject matter relating to the on-going dialogue that is directed to a program;

a subject matter dynamically determined based on the state of the user and/or the dialogue context related to the current scene; and a combination thereof.

6. The method of claim 1, wherein the feedback corresponds to a response to be directed to the user in response to the current response of the user and is to be conveyed to the user in the on-going dialogue via at least one of speech and visual means.

7. The method of claim 1, wherein the state of the user further includes change of facial expression of the user includes a change in the user's gaze towards an object present in the current scene.

8. Machine readable and non-transitory medium having information recorded thereon for managing a dialogue with a user, wherein the information, when read by the machine, causes the machine to perform:

receiving information representing surrounding of a user engaged in an on-going dialogue on a topic of a program with an intended goal, wherein the information includes a current response from the user in the on-going dialogue, is acquired from a current scene in which the user is present, and captures characteristics of the user and the current scene;

extracting relevant features from the information;

detecting, based on the relevant features, a state of the user at different conceptual levels including a physical appearance of the user and one or more expressions of the user;

determining a dialogue context surrounding the current scene, with a physical object therein, based on the relevant features;

accessing a dialogue tree corresponding to the program;

generating a feedback directed to the current response of the user, based on at least one of the dialogue tree, the physical appearance of the user, and the dialogue context, wherein the feedback is on a different topic determined based on one of the physical appearance of the user and the physical object; and continuing on the dialogue with the user on the topic of the program to achieve the intended goal on the topic of the program by leveraging the physical object.

9. The medium of claim 8, wherein the information includes multimodal sensor data in at least one of audio, visual, textual, and haptic modalities, where the audio sensor data record the current response from the user and/or acoustic sound from the current scene.

10. The medium of claim 8, wherein the state of the user further includes at least one of:

a text representing the current response from the user in the on-going dialogue;

one or more emotions of the user inferred based on the one or more expressions of the user; and an intent of the user inferred based on at least one of the expression and the one or more emotions, wherein the physical appearance includes a color and a style of the user's skin, hair, facial, eye, and cloth, observed from the current scene.

11. The medium of claim 8, wherein the dialogue context includes at least one of:

at least one object present in the current scene and a characterization thereof;

an estimated classification of the current scene;

a characterization of the current scene; and a sound heard from the environment of the current scene.

12. The medium of claim 8, wherein the information, when read by the machine, further causes the machine to perform determining a topic of the feedback, wherein the topic is one of a subject matter relating to the on-going dialogue that is directed to a program;

a subject matter dynamically determined based on the state of the user and/or the dialogue context related to the current scene; and a combination thereof.

13. The medium of claim 8, wherein the feedback corresponds to a response to be directed to the user in response to the current response of the user and is to be conveyed to the user in the on-going dialogue via at least one of speech and visual means.

14. The medium of claim 10, wherein the state of the user further includes the user's gaze towards an object present in the current scene.

15. A system for managing a dialogue with a user, comprising:

a multimodal data analysis unit implemented by a processor and configured for receiving information representing surrounding of a user engaged in an on-going dialogue on a topic of a program with an intended goal, wherein the information includes a current response from the user in the on-going dialogue, is acquired from a current scene in which the user is present, and captures characteristics of the user and the current scene, and extracting relevant features from the information;

a dialogue context info determiner implemented by a processor and configured for determining a dialogue context surrounding the current scene, with a physical object therein, based on the relevant features;

a user state estimator implemented by a processor and configured for detecting, based on the relevant features, a state of the user at different conceptual levels including a physical appearance of the user and one or more expressions of the user; and a dialogue controller implemented by a processor and configured for accessing a dialogue tree corresponding to the program, generating a feedback directed to the current response of the user, based on at least one of the dialogue tree, the physical appearance of the user, and the dialogue context, wherein the feedback is on a different topic determined based on one of the physical appearance of the user and the physical object, and continuing on the dialogue with the user on the topic of the program to achieve the intended goal on the topic of the program by leveraging the physical object.

16. The system of claim 15, wherein the information includes multimodal sensor data in at least one of audio, visual, textual, and haptic modalities, where the audio sensor data record the current response from the user and/or acoustic sound from the current scene.

17. The system of claim 15, wherein the state of the user further includes at least one of:

a text representing the current response from the user in the on-going dialogue;

one or more emotions of the user inferred based on the one or more expressions of the user; and an intent of the user inferred based on at least one of the expression and the one or more emotions, wherein the physical appearance includes a color and a style of the user's skin, hair, facial, eye, and cloth, observed from the current scene.

18. The system of claim 15, wherein the dialogue context includes at least one of:

at least one object present in the current scene and a characterization thereof;

an estimated classification of the current scene;

a characterization of the current scene; and a sound heard from the environment of the current scene.

19. The system of claim 15, wherein the dialogue controller is further configured for determining a topic of the feedback, wherein the topic is one of a subject matter relating to the on-going dialogue that is directed to a program;

a subject matter dynamically determined based on the state of the user and/or the dialogue context related to the current scene; and a combination thereof.

20. The system of claim 15, wherein the feedback corresponds to a response to be directed to the user in response to the current response of the user and is to be conveyed to the user in the on-going dialogue via at least one of speech and visual means.

21. The system of claim 17, wherein the state of the user further includes the user's gaze towards an object present in the current scene.

* * * * *